United States Patent Office 3,662,001
Patented May 9, 1972

3,662,001
PRODUCTION OF 3-KETOBUTANOL-(1)
Herbert Mueller, Frankenthal, and Hermann Overwien, Harald Koehl, and Horst Pommer, Ludwigshafen, Germany, assignors to Badische Anilin- & Soda-Fabrik Aktiengesellschaft, Ludwigshafen (Rhine), Germany
No Drawing. Filed Apr. 25, 1969, Ser. No. 819,454
Claims priority, application Germany, May 7, 1968,
P 17 68 377.1
The portion of the term of the patent subsequent to Dec. 1, 1987, has been disclaimed
Int. Cl. C07c *49/18*
U.S. Cl. 260—594     8 Claims

ABSTRACT OF THE DISCLOSURE

Production of 3-ketobutanol by reaction of acetone with aqueous formaldehyde solution at a temperature above 210° up to 300° C. at a superatmospheric pressure. Methyl vinyl ketone (which can be polymerized to high molecular weight compounds) is prepared from 3-ketobutanol by elimination of water in the presence of aluminum oxide.

---

This invention relates to an improved process for the production of 3-ketobutanol-(1) by reaction of acetone with aqueous formaldehyde solution.

It is known from British patent specifications Nos. 955,449 and 791,541 that 3-ketobutanol together with a major amount of polymethylol compounds is obtained by reaction of acetone with aqueous formaldehyde solution. The 3-ketobutanol can only be recovered from the mixture with polymethylol compounds at great expense. Moreover, the yield of 3-ketobutanol-(1) is greatly decreased by the formation of polymethylol compounds. It is also known from U.S. patent specifications Nos. 989,-993, 2,064,564 and 2,378,206 that 3-ketobutanol-(1) may be obtained from acetone by reaction with aqueous formaldehyde solutions or paraformaldehyde at temperatures of from 0° to 40° C. This method has the disadvantage that the reaction takes several hours. Moreover, it is stated in U.S. patent specification No. 2,510,914 that the reaction of acetone with aqueous formaldehyde solution in a column at the boiling temperature of acetone gives good yields of 3-ketobutanol-(1) with reference to formaldehyde used. Owing to the long residence time of the acetone in the column in the presence of alkaline catalysts, a large amount of diacetone alcohol is formed, so that the yield, with reference to acetone used, is far from good. Great waste by formation of diacetone alcohol also occurs when 3-ketobutanol-(1) is prepared by the method described in U.S. patent specification No. 2,395,414 because it is necessary to use a large excess of acetone under relatively strong alkaline conditions in order to obtain good yields with reference to formaldehyde.

The object of this invention is to provide an improved process for the production of 3-ketobutanol in which good yields of 3-ketobutanol are obtained with reference to acetone and formaldehyde. It is another object of the invention to provide an improved process for the production of 3-ketobutanol in which only small amounts of byproducts are formed. It is a further object of the invention to carry out the reaction in a short time.

In accordance with this invention the said and other objects and advantages are achieved in an improved process for the production of 3-ketobutanol-(1) by reaction of acetone with aqueous formaldehyde solution at elevated temperature and at superatmospheric pressure, wherein the improvement consists in carrying out the reaction at a temperature above 210° up to 300° C.

The formaldehyde is used in aqueous solution, preferably concentrated aqueous solution. It is advantageous to use aqueous formaldehyde solution of 30 to 40% by weight strength. In general 4 to 10 moles, preferably 5 to 7 moles, of acetone is used per mole of formaldehyde.

The reaction is advantageously carried out in the presence of an alkaline catalyst. Examples of suitable alkaline catalysts are hydroxides and carbonates of metals of the first main group of the Periodic System, and also hydroxides of the second main group of the Periodic System, and also salts of strong bases with weak acids, such as sodium borate, sodium acetate, sodium formate, secondary sodium phosphate or tertiary sodium phosphate. For example alkali metal alcoholates or organic bases, such as pyridine, quinoline, trialkylamines and basic buffer systems are also suitable. Salts of alkali metals with carboxylic acids, particularly with carboxylic acids having one to four carbon atoms, are preferably used. It is preferred to use 0.1 to 5% by weight, particularly 0.5 to 3% by weight, of alkaline catalyst with reference to the formaldehyde used.

The reaction is carried out at a temperature above 210° up to 300° C., preferably from 220° to 280° C. The pressure used may be the vapor pressure of the reactants at the reaction temperature. It is preferred however to use higher pressures. A pressure higher than the vapor pressure of the reactants can be achieved by forcing in inert gases, such as nitrogen. It is advantageous to carry out the reaction at pressures of 30 to 500 atmospheres, preferably at 100 to 300 atmospheres. When using a catalyst, the reaction period is advantageously thirty seconds to twenty minutes, preferably one to fifteen minutes. When the reaction is carried out in the absence of a catalyst, the reaction period is preferably twenty minutes to three hours.

Particularly good yields are obtained by cooling the reaction solution to a temperature of not more than 100° C. within a short time after the reaction, for example within thirty seconds to five minutes, preferably within one minute to three minutes.

The process according to this invention may be carried out for example by heating the reactants acetone and aqueous formaldehyde, which preferably have been preheated, in the specified amounts in a preheated reactor to the said temperature; the specified amount of alkaline catalyst may be contained in the formaldehyde solution. After the said reaction period, the reaction solution is rapidly cooled to below the said temperature by means of a cooler.

The reaction is preferably carried out continuously by pumping the acetone, aqueous formaldehyde solution and catalyst (when used) in the specified ratio at the said temperature through a tube bundle. The cooled solution is worked up by fractional distillation.

When 3-ketobutanol-(1) prepared according to the invention is treated with aluminium oxide at temperatures of 100° to 200° C., methyl vinyl ketone is obtained which is suitable for the production of polymers (cf. Houben Weyl, Methoden der Organischen Chemie, Georg Thieme Verlag, Stuttgart (1961), volume 14/1, p. 1090).

The invention is illustrated by the following example in which the parts specified are parts by weight unless stated otherwise. Parts by weight bear the same relation to parts by volume as the gram to the liter.

EXAMPLE

A mixture of 800 parts of acetone and 100 parts of 37% aqueous formaldehyde solution is forced with nitrogen into a pressure vessel preheated to 260° C. The reaction solution is heated at 260° C. for 5 minutes and at the end of this period cooled to 100° C. within 2 minutes. Excess acetone is then distilled off and the residue is fractionally distilled in vacuo. 87 parts of 3-ketobutanol having a boiling point of 85° C. at 20 mm. Hg is obtained. The yield, with reference to formaldehyde, is 80% and, with reference to acetone, practically quantitative.

We claim:

1. A process for the production of 3-ketobutanol-(1) which comprises reacting 4 to 10 moles of acetone with 1 mole of formaldehyde in concentrated aqueous solution and in liquid phase at elevated temperature and at a pressure from the vapor pressure of the substances used at the temperature used up to 500 atmospheres, said reaction being carried out at a temperature above 210° up to 300° C.

2. A process as claimed in claim 1 wherein 5 to 7 moles of acetone is used per mole of formaldehyde.

3. A process as claimed in claim 1 wherein the formaldehyde is used in 30 to 40% by weight aqueous solution.

4. A process as claimed in claim 1 wherein a pressure of 30 to 500 atmospheres is used.

5. A process as claimed in claim 1 wherein an alkaline catalyst is used.

6. A process as claimed in claim 1 wherein 0.1 to 5% by weight (with reference to the formaldehyde used) of alkaline catalyst is used.

7. A process as claimed in claim 1 wherein the reaction solution is cooled to a temperature of not more than 100° C. within thirty seconds to five minutes after the reaction.

8. A process as claimed in claim 1 carried out at a temperature of 220° to 280° C.

References Cited

UNITED STATES PATENTS 3,544,634   12/1970   Mueller et al. _____ 260—594

FOREIGN PATENTS 381,686   10/1932   Great Britain _____ 260—594
1,536,749   7/1968   France _____ 260—594

DANIEL D. HORWITZ, Primary Examiner

U.S. Cl. X.R.

260—593 R